(12) United States Patent
Lee et al.

(10) Patent No.: US 11,473,977 B2
(45) Date of Patent: Oct. 18, 2022

(54) MOVABLE TEMPERATURE MEASUREMENT DEVICE FOR SECONDARY BATTERY AND CHARGE/DISCHARGE APPARATUS COMPRISING THE SAME

(71) Applicant: LG CHEM, LTD., Seoul (KR)

(72) Inventors: Beom-Koon Lee, Daejeon (KR); Hyo-Jin Park, Daejeon (KR); Dong-Hun Bae, Daejeon (KR); Joon-Sung Bae, Daejeon (KR); Eui-Kyung Lee, Daejeon (KR); Suk-Hyun Hong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 413 days.

(21) Appl. No.: 16/759,871

(22) PCT Filed: May 9, 2019

(86) PCT No.: PCT/KR2019/005590
§ 371 (c)(1),
(2) Date: Apr. 28, 2020

(87) PCT Pub. No.: WO2019/240379
PCT Pub. Date: Dec. 19, 2019

(65) Prior Publication Data
US 2020/0340863 A1     Oct. 29, 2020

(30) Foreign Application Priority Data

Jun. 12, 2018 (KR) .................. 10-2018-0067737

(51) Int. Cl.
*G01J 5/02* (2022.01)
*G01J 5/10* (2006.01)
*H01M 10/44* (2006.01)

(52) U.S. Cl.
CPC ............... *G01J 5/0205* (2013.01); *G01J 5/10* (2013.01); *H01M 10/443* (2013.01)

(58) Field of Classification Search
CPC ............ G01J 5/0205; G01J 5/047; G01J 5/10; H01M 10/486; H01M 10/00; H01M 10/443
See application file for complete search history.

(56) References Cited

U.S. PATENT DOCUMENTS

| | | |
|---|---|---|
| 7,772,799 B2 | 8/2010 | Wu |
| 2005/0073314 A1* | 4/2005 | Bertness ............... G01R 31/379 |
| | | 324/426 |

(Continued)

FOREIGN PATENT DOCUMENTS

| | | | |
|---|---|---|---|
| CN | 102200477 A * | 9/2011 | ............ G01J 5/0096 |
| CN | 202182784 U | 4/2012 | |

(Continued)

OTHER PUBLICATIONS

Extended European Search Report for EP 19818742.9, dated Jul. 1, 2021.

(Continued)

*Primary Examiner* — Gail Kaplan Verbitsky
(74) *Attorney, Agent, or Firm* — Birch, Stewart, Kolasch & Birch, LLP

(57) ABSTRACT

A temperature measurement device suitable for measuring the temperature of each secondary battery to consider a temperature deviation between secondary batteries that may occur during charging/discharging in the formation process and capacity test after the secondary battery assembly process, and a charge/discharge apparatus including the temperature measurement device are provided. The temperature measurement device is for measuring a temperature of at least one of a plurality of secondary batteries arranged along an X-axis direction, spaced apart from one another, in a (Continued)

standing position, and includes a non-contact temperature sensor unit which is insertable into a spacing between adjacent secondary batteries to measure the temperature of the secondary battery that the non-contact temperature sensor unit faces in a non-contact manner, and a Z-axis transfer device which inserts the non-contact temperature sensor unit into the spacing downward from above the secondary batteries in a Z-axis direction.

19 Claims, 14 Drawing Sheets

(56) References Cited

U.S. PATENT DOCUMENTS

| | | | | |
|---|---|---|---|---|
| 2011/0235674 A1* | 9/2011 | Tong | ................. | G01J 5/0096 |
| | | | | 374/E1.018 |
| 2012/0021255 A1 | 1/2012 | Kim | | |
| 2013/0164579 A1 | 6/2013 | Harii et al. | | |
| 2016/0144546 A1 | 5/2016 | Song et al. | | |

FOREIGN PATENT DOCUMENTS

| | | | | | |
|---|---|---|---|---|---|
| CN | 205941696 | U | * | 2/2017 | |
| CN | 106772079 | A | * | 5/2017 | |
| CN | 107192462 | A | | 9/2017 | |
| CN | 207675796 | U | * | 7/2018 | |
| CN | 215678677 | U | * | 1/2022 | |
| CN | 216302604 | U | * | 4/2022 | |
| DE | 102014206821 | A1 | * | 10/2015 | ......... H01M 10/482 |
| DE | 20 2017 006 725 | U1 | | 3/2018 | |
| DE | 202017006725 | U1 | * | 4/2018 | |
| EP | E P-3748801 | A4 | * | 5/2021 | ........ H01M 10/0404 |
| JP | 10-304576 | A | | 11/1998 | |
| JP | 2002-171685 | A | | 6/2002 | |
| JP | 2010-127778 | A | | 6/2010 | |
| JP | 2016-180755 | A | | 10/2016 | |
| KR | 10-2008-0017108 | A | | 2/2008 | |
| KR | 10-2010-0083049 | A | | 7/2010 | |
| KR | 10-2013-0001874 | A | | 1/2013 | |
| KR | 10-2013-0029412 | A | | 3/2013 | |
| KR | 10-1245285 | B1 | | 3/2013 | |
| KR | 10-2016-0058516 | A | | 5/2016 | |
| KR | 10-1617337 | B1 | | 5/2016 | |
| KR | 10-2017-0103341 | A | | 9/2017 | |
| WO | WO-2020130372 | A1 | * | 6/2020 | ........ H01M 10/4285 |

OTHER PUBLICATIONS

International Search Report issued in PCT/KR2019/005590 (PCT/ISA/210), dated Aug. 28, 2019.

* cited by examiner

MOVABLE TEMPERATURE MEASUREMENT DEVICE FOR SECONDARY BATTERY AND CHARGE/DISCHARGE APPARATUS COMPRISING THE SAME

TECHNICAL FIELD

The present disclosure relates to a device for measuring the temperature of a secondary battery and a charge/discharge apparatus comprising the same. The present application claims the benefit of Korean Patent Application No. 10-2018-0067737 filed on Jun. 12, 2018 with the Korean Intellectual Property Office, the disclosure of which is incorporated herein by reference in its entirety.

BACKGROUND ART

With the technology development and the growing demand for mobile devices, electric vehicles, hybrid electric vehicles, energy storage systems (ESSs) and uninterrupted power systems (UPS), secondary batteries as a source of energy are in dramatically increasing demand, and to meet various demands, many studies have been made on secondary batteries.

Because an assembly process is performed on a secondary battery in discharged state, the assembled secondary battery is charged for activation to work as a battery. Accordingly, the secondary battery assembly process is followed by a formation process of performing charge/discharge for giving good charge and discharge characteristics to the assembled secondary battery, and an evaluation process including a capacity test for testing whether the charge/discharge capacity is sufficient.

The charge/discharge operation of the secondary battery in the formation process and the capacity test is performed, for example, using an apparatus shown in FIG. 1.

Referring to FIG. 1, a plurality of secondary batteries 1 is arranged on a tray 3, and comes into contact with pins (not shown) for individually applying the power source to each secondary battery 1, and in this state, charging/discharging is performed.

The temperature of the secondary batteries 1 rises during charging/discharging of the secondary batteries 1. When the temperature of the secondary batteries 1 rises, the charge/discharge operation cannot be smoothly performed. Accordingly, it requires a suitable cooling means when performing charge/discharge, and usually, after the tray 3 is put in a chamber (not shown), an uniform and effective cooling operation is performed on the plurality of secondary batteries 1 through an air conditioner (not shown).

A secondary battery having a defect in initial charge/discharge may show different temperature behaviors from a normal battery. Accordingly, a defective secondary battery is determined through temperature measurement. Conventionally, a thermocouple 5 is used for temperature measurement.

However, a temperature deviation between the secondary batteries 1 may occur due to heat generated from the secondary batteries 1 during charging. A lithium secondary battery forms a Solid Electrolyte Interface (SEI) film in the initial charge, and is usually charged by applying a low current of 0.1 C-rate. However, when high rated charging is performed at a higher C-rate to reduce the process time, heat generation increases and the temperature deviation between the secondary batteries 1 increases. As the door of the chamber, in which the tray 3 is placed, is opened and closed, a temperature deviation may occur due to the external air. However, in many cases, the cooling performance by the currently available air conditioner is insufficient to reduce the temperature deviation between the secondary batteries 1.

The temperature deviation between the secondary batteries 1 causes changes in resistance and voltage and increases deviations in capacity testing. The charge/discharge capacity is calculated using a correction equation based on temperature to compensate for a difference between a preset temperature and an actual temperature of the air conditioner by measuring the temperature using the thermocouple 5, but the conventional thermocouple 5 does not measure the temperature of each secondary battery 1, and measures the atmosphere temperature in the tray 3, and accordingly, it cannot reflect a temperature deviation between the secondary batteries 1 in the tray 3.

DISCLOSURE

Technical Problem

The present disclosure is designed to solve the above-described problem, and therefore the present disclosure is directed to providing a temperature measurement device suitable for measuring the temperature of each secondary battery to consider a temperature deviation between secondary batteries that may occur during charging/discharging in the formation process and capacity test after the secondary battery assembly process.

The present disclosure is further directed to providing a charge/discharge apparatus including the temperature measurement device.

These and other objects and advantages of the present disclosure will be understood by the following description and will be apparent from the embodiments of the present disclosure. Further, it will be readily understood that the objects and advantages of the present disclosure are realized by the means set forth in the appended claims and combinations thereof.

Technical Solution

To achieve the above-described object, a temperature measurement device according to the present disclosure is a temperature measurement device for measuring a temperature of at least one secondary battery of a plurality of secondary batteries arranged along an X-axis direction, spaced apart from one another, in a standing position with a side of the at least one secondary battery extending in a Y-axis direction below the temperature measurement device, and includes a non-contact temperature sensor unit being insertable into a spacing between adjacent secondary batteries of the plurality of secondary batteries to measure the temperature of the at least one secondary battery that the non-contact temperature sensor unit faces in a non-contact manner, and a Z-axis transfer device configured to insert the non-contact temperature sensor unit into the spacing downward from above the plurality of secondary batteries in a Z-axis direction perpendicular to the X-axis direction and Y-axis direction and take out the non-contact temperature sensor unit in an opposing direction by lifting up and down in the Z-axis direction.

According to an embodiment of the present disclosure, the temperature measurement device may further include a Y-axis transfer device configured to transfer the Z-axis transfer device mounted thereon along the Y-axis direction. In this case, the non-contact temperature sensor unit may include a single temperature sensor or multiple temperature sensors arranged along the Z-axis direction to a length corresponding to a side of the at least one secondary battery extending in the Z-axis direction.

According to another embodiment of the present disclosure, in addition to the Y-axis transfer device, the temperature measurement device may further include an X-axis transfer device configured to transfer the Y-axis transfer device mounted thereon along X-axis direction. In this case, the non-contact temperature sensor unit may include a single temperature sensor or multiple temperature sensors arranged along the Z-axis direction to a length corresponding to a side of the at least one secondary battery extending in the Z-axis direction.

According to an embodiment of the present disclosure, the non-contact temperature sensor unit and the Z-axis transfer device may be provided in a number corresponding to a number of the plurality of secondary batteries. In this case, an X-axis transfer device is unnecessary.

According to another embodiment of the present disclosure, the temperature measurement device may further include an X-axis transfer device configured to transfer the Z-axis transfer device mounted thereon along the X-axis direction without the Y-axis transfer device. In this instance, the non-contact temperature sensor unit may include multiple temperature sensors arranged along the Y-axis direction to a length corresponding to the side of the at least one secondary battery extending in the Y-axis direction or a plate member having an area corresponding to an area defined in a Y-Z plane of the at least one secondary battery and multiple temperature sensors arranged along the Y-axis and the Z-axis on the plate member.

In a preferred embodiment, the Y-axis transfer device includes a Y-axis guide beam having a Y-axis linear motion (LM) guide spaced above the plurality of secondary batteries, and a Y-axis sliding block having a Y-axis LM slider configured to make a reciprocating motion along the Y-axis guide beam, wherein the Y-axis LM slider is fitted into the Y-axis LM guide and slides along the Y-axis guide beam, and wherein the Z-axis transfer device is connected to the Y-axis sliding block.

Additionally, the Z-axis transfer device may include a Z-axis guide beam extending at a right angle to the Y-axis guide beam and having a Z-axis LM guide, and a Z-axis sliding block having a Z-axis LM slider configured to make a reciprocating motion along the Z-axis guide beam, and wherein the Z-axis LM slider is fitted into the Z-axis LM guide and slides along the Z-axis guide beam. Alternatively, the Z-axis transfer device may be a link unit including at least one X-type link including two link members rotatably cross-linked together.

In an embodiment in which in addition to the Y-axis transfer device, the temperature measurement device further includes the X-axis transfer device, the X-axis transfer device may include a pair of X-axis guide beams parallel to each other, extending at a right angle to the Y-axis guide beam in an X-Y plane and having an X-axis LM guide on each of the X-axis guide beams and an X-axis LM slider fitted into each of the X-axis LM guides and slides a long a respective X-axis guide beam, and wherein opposite ends of the Y-axis guide beam are connected to the X-axis LM sliders.

Also, in this instance, the Z-axis transfer device may include a Z-axis guide beam extending at a right angle to the X-axis guide beam and having a Z-axis LM guide, and a Z-axis sliding block having a Z-axis LM slider configured to make a reciprocating motion along the Z-axis guide beam, and wherein the Z-axis LM slider is fitted into the Z-axis LM guide and slides along the Z-axis guide beam. Alternatively, the Z-axis transfer device may be a link unit including at least one X-type link including two link members rotatably cross-linked together.

In an embodiment in which the temperature measurement device further includes the X-axis transfer device without the Y-axis transfer device, the X-axis transfer device may include a pair of X-axis guide beams parallel to each other above the plurality of secondary batteries and having an X-axis LM guide on each of the X-axis guide beams, and an X-axis sliding block having an X-axis LM slider fitted into each of the X-axis LM guides and configured to make a reciprocating motion along a respective X-axis guide beam, and the Z-axis transfer device may be connected to the X-axis sliding block.

Also, in this instance, the Z-axis transfer device may include a Z-axis guide beam extending at a right angle to the X-axis guide beam and having a Z-axis LM guide, and a Z-axis sliding block having a Z-axis LM slider configured to make a reciprocating motion along the Z-axis guide beam, and wherein the Z-axis LM slider is fitted into the Z-axis LM guide and slides along the Z-axis guide beam. Alternatively, the Z-axis transfer device may be a link unit including at least one X-type link including two link members rotatably cross-linked together.

In a more preferred embodiment, the non-contact temperature sensor unit further includes a temperature sensor to measure atmosphere temperature.

To achieve another object, a charge/discharge apparatus according to the present disclosure includes the temperature measurement device according to the present disclosure, a tray for receiving a plurality of secondary batteries arranged along the X-axis direction, spaced apart from one another, in a standing position with a side of at least one secondary battery extending in the Y-axis direction below the temperature measurement device, a charge/discharge probe, and a power supplier to individually apply a power source to the plurality of secondary batteries.

Advantageous Effects

According to the present disclosure, it is possible to measure the temperature of a plurality of secondary batteries for each secondary battery. Accordingly, for example, it is possible to measure the temperature of each secondary battery in the formation process and capacity test after the secondary battery assembly process. It is possible to calculate a temperature deviation between secondary batteries, so when calculating the capacity, the temperature deviation may be taken into account. Because the temperature is measured by the unit of secondary battery, not by the unit of tray, accuracy of temperature correction in the capacity test is improved.

According to the present disclosure, it is possible to measure the temperature quickly in a non-contact manner using the non-contact temperature sensor unit without affecting a secondary battery.

According to the present disclosure, basically, the moveable temperature measurement device is designed to transfer the non-contact temperature sensor unit through Z-axis lift up and down by the Z-axis transfer device. When the moveable temperature measurement device further includes a Y-axis transfer device and/or an X-axis transfer device, it is possible to reduce the number of non-contact temperature sensors necessary to measure the temperature of each secondary battery. As it is implemented in a moveable type, it is possible to measure the temperature of a plurality of secondary batteries using a small number of non-contact temperature sensors as possible.

According to the present disclosure, it is possible to measure many positions of a secondary battery using a single sensor or multiple sensors, and obtain data for research when the measured temperature is recorded and stored in a database (DB).

BRIEF DESCRIPTION OF DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

MODE FOR DISCLOSURE

Figure 1:
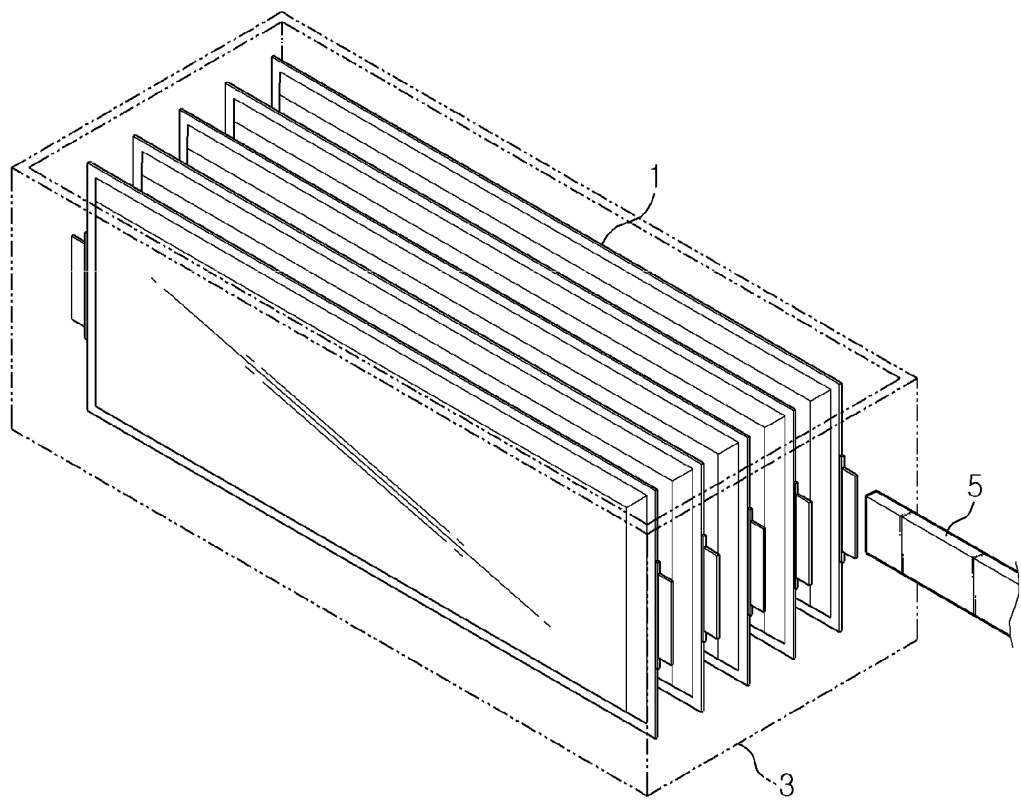
FIG. 1 shows an apparatus that performs a charge/discharge operation of secondary batteries according to the related art.

Hereinafter, the preferred embodiments of the present disclosure will be described in detail with reference to the accompanying drawings. However, the embodiments of the present disclosure may be modified in other different forms, and the scope of the present disclosure should not be construed as being limited to the embodiments disclosed below. These embodiments are provided to help those having ordinary skill in the art to fully understand the present disclosure.

It should be understood that the terms or words used in the specification and the appended claims should not be construed as being limited to general and dictionary meanings, but interpreted based on the meanings and concepts corresponding to the technical aspects of the present disclosure on the basis of the principle that the inventor is allowed to define the terms appropriately for the best explanation. Therefore, the embodiments described herein and illustrations shown in the drawings are just a most preferred embodiment of the present disclosure, but not intended to fully describe the technical aspects of the present disclosure, so it should be understood that a variety of other equivalents and modifications could be made thereto at the time of filing the application.

Additionally, in describing the present disclosure, when it is deemed that a certain detailed description of relevant known elements or functions renders the key subject matter of the present disclosure ambiguous, the detailed description is omitted herein. In the drawings, the shape of the element may be exaggerated to put emphasis on clearer descriptions, and like reference numerals denote like elements.

Unless the context clearly indicates otherwise, it will be understood that the term "comprises" or "includes" when used in this specification, specifies the presence of stated elements, but does not preclude the presence or addition of one or more other elements. In addition, throughout the specification, it will be further understood that when an element is referred to as being "connected to" another element, it can be directly connected to the other element or intervening elements may be present.

The present disclosure basically proposes a temperature measurement device designed to measure the temperature of a plurality of secondary batteries for each secondary battery using a non-contact temperature sensor. The non-contact temperature sensor is provided in a non-contact temperature sensor unit, and the non-contact temperature sensor unit is transferred through Z-axis lift up and down by a Z-axis transfer device, and thus the temperature measurement device according to the present disclosure may be referred to as a moveable temperature measurement device.

According to the present disclosure, it is possible to measure the temperature quickly in a non-contact manner using the non-contact temperature sensor unit without affecting the secondary batteries. Examples of the non-contact temperature sensor include an infrared sensor. The number of non-contact temperature sensors may increase or decrease as necessary. That is, the number of temperature sensors for measuring temperature may be one or more.

That is to say, a single temperature sensor or multiple temperature sensors may be used. In each case, for more efficient operation, the temperature measurement device may further include a Y-axis transfer device and/or an X-axis transfer device. That is, a 2-axis transfer device including a Z-axis transfer device and a Y-axis transfer device, a 2-axis transfer device including a Z-axis transfer device and an X-axis transfer device, or a 3-axis transfer device including a Z-axis transfer device, a Y-axis transfer device and an X-axis transfer device may be used.

First, temperature measurement devices according to first and second embodiments use a single temperature sensor, and include a 3-axis transfer device including an X-axis transfer device, a Y-axis transfer device and a Z-axis transfer device, suitable for the single temperature sensor to measure the temperature of a plurality of secondary batteries for each secondary battery. A temperature measurement device according to a third embodiment includes a plurality of single temperature sensors and an X-axis transfer device may be omitted. Temperature measurement devices according to fourth to sixth embodiments use multiple temperature sensors. In the fifth embodiment, the multiple temperature sensors are disposed in axial arrangement and a Y-axis transfer device may be omitted, and in the sixth embodiment, a plurality of multiple temperature sensors are provided and a Y-axis transfer device as well as an X-axis transfer device may be omitted. Its detailed description will be provided below.

Figure 2:
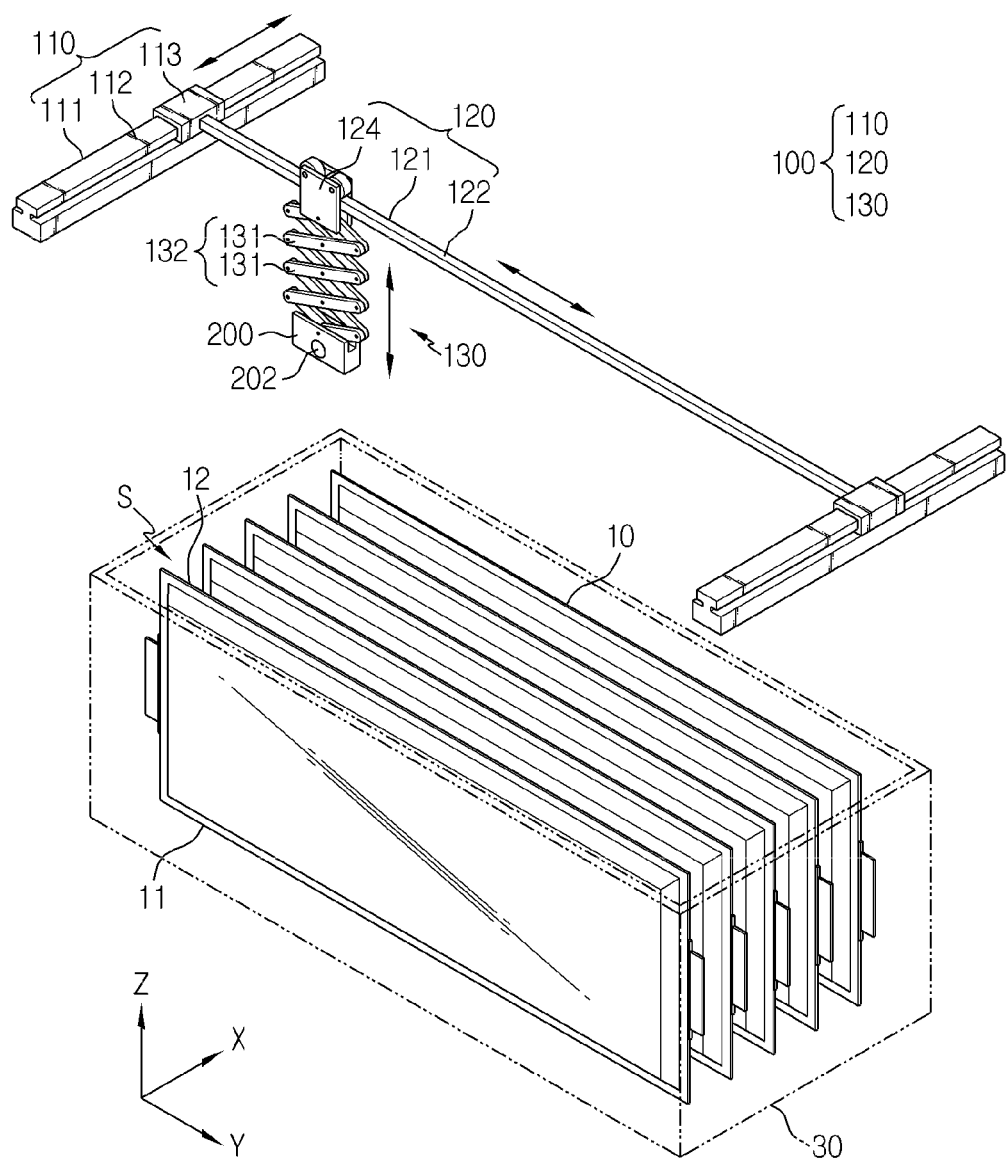
FIG. 2 shows a temperature measurement device according to a first embodiment of the present disclosure.

FIG. 2 shows the temperature measurement device according to the first embodiment of the present disclosure. This embodiment is configured such that a non-contact temperature sensor may make 3-axis movements. The temperature measurement device may be installed in a tray of a charge/discharge apparatus in which a plurality of secondary batteries is mounted for capacity testing.

Referring to FIG. 2, the plurality of secondary batteries 10 is spaced apart from one another along X-axis direction in a standing position with one side 11 of Y-axis direction being down. For example, the secondary batteries 10 may be received and arranged in the tray 30 that may be included in the charge/discharge apparatus of the present disclosure as described below. The drawings are provided to help an understanding, and the actual number of secondary batteries in the tray may be different from those of the drawings.

The temperature measurement device T1 according to the first embodiment includes a 3-axis transfer device 100 and a non-contact temperature sensor unit 200. The 3-axis transfer device 100 includes an X-axis transfer device 110, a Y-axis transfer device 120 and a Z-axis transfer device 130. The 3-axis transfer device 100 may be made of aluminum or stainless steel having light weight and high durability, but the present disclosure is not restricted or limited by the material and characteristics. The non-contact temperature sensor unit 200 is connected to the Z-axis transfer device 130. The non-contact temperature sensor unit 200 is inserted into a spacing S between the secondary batteries 10 by the 3-axis transfer device 100, and measures the temperature of the secondary battery 10 that the non-contact temperature sensor unit 200 faces in a non-contact manner.

The X-axis transfer device 110 includes a pair of X-axis guide beams 111 parallel to each other, spaced apart in Z-axis direction above the secondary batteries 10, perpendicular to the other side 12 of Y-axis direction of the secondary batteries 10 on the X-Y plane. For example, the pair of X-axis guide beams 111 is provided above the secondary batteries 10, spaced apart from each other by the length of one side 11 of Y-axis direction or more along the Y-axis direction of the secondary batteries 10. An X-axis LM guide 112 is installed in the lengthwise direction of the X-axis guide beam 111. The X-axis transfer device 110 also includes an X-axis LM slider 113 to slide in the lengthwise direction, and the X-axis LM slider 113 is fitted into the X-axis LM guide 112.

The Y-axis transfer device 120 includes a Y-axis guide beam 121 perpendicular to the X-axis guide beam 111 on the X-Y plane, i.e., parallel to the other side 12 of Y-axis direction of the secondary batteries 10, spaced apart in Z-axis direction above the secondary batteries 10. The Y-axis guide beam 121 may be connected as a roughly bridge structure between the pair of X-axis guide beams 111. A Y-axis LM guide 122 is installed in the lengthwise direction of the Y-axis guide beam 121. Two ends of the Y-axis guide beam 121 are connected to the X-axis LM slider 113. The Y-axis transfer device 120 includes a Y-axis sliding block 124 having a Y-axis LM slider to make reciprocating movement in the lengthwise direction of the Y-axis guide beam 121, and the Y-axis LM slider is fitted into the Y-axis LM guide 122 and slides in the lengthwise direction.

The Z-axis transfer device 130 may be connected to the Y-axis sliding block 124. In this embodiment, the Z-axis transfer device 130 is a link unit including at least one X-type link 132 including two link members 131 rotatably cross-linked together. The link unit may be called a scissor arm or a scissor lift. The non-contact temperature sensor unit 200 is connected to the lower end of the Z-axis transfer device 130, and the Z-axis transfer device 130 lifts up and down the non-contact temperature sensor unit 200 in Z-axis direction. Particularly, the Z-axis transfer device 130 inserts the non-contact temperature sensor unit 200 into the spacing S downward from above the secondary batteries 10 in the Z-axis direction, then takes out in the direction opposite to the insertion direction.

As described above, the Y-axis transfer device 120 transfers the Z-axis transfer device 130 along the Y-axis direction, and the X-axis transfer device 110 transfers the Y-axis transfer device 120 along the X-axis direction. The non-contact temperature sensor unit 200 is connected to the Z-axis transfer device 130, and the Z-axis transfer device 130 lifts up and down the non-contact temperature sensor unit 200 in Z-axis direction. Accordingly, the non-contact temperature sensor unit 200 can carry out 3-axis transfer along X-axis, Y-axis and Z-axis.

The non-contact temperature sensor unit 200 includes a single temperature sensor 202. A method of measuring the temperature of the plurality of secondary batteries 10 using the non-contact temperature sensor unit 200 may be performed as below.

Figure 3:
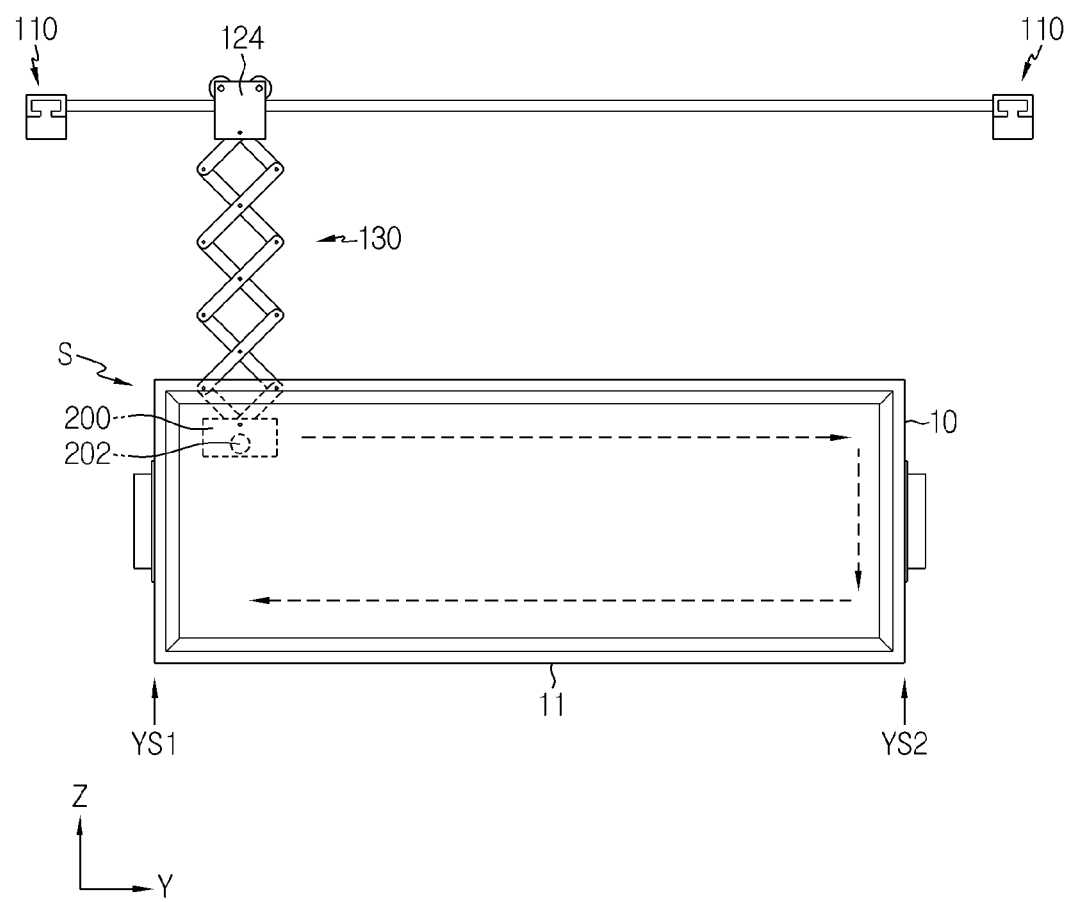
FIGS. 3 and 4 are diagrams illustrating a method for measuring the temperature of one secondary battery in a first embodiment of the present disclosure.
Figure 4:
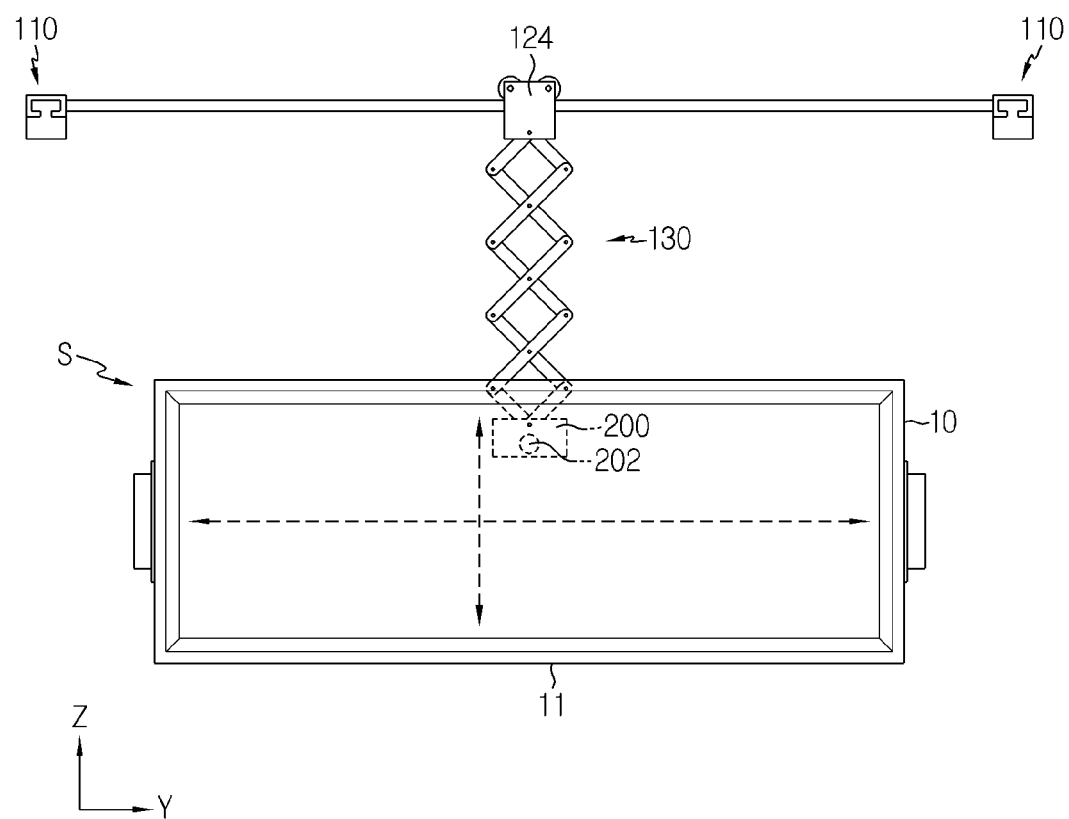

The non-contact temperature sensor unit 200 measures the temperature from one side of X-axis direction. That is, measurement starts from the outermost secondary battery among the plurality of arranged secondary batteries 10. Additionally, referring to FIG. 3, the non-contact temperature sensor unit 200 is inserted into the spacing S downward by the Z-axis transfer device 130 from one side YS1 of Y-axis direction near the other side 12 of Y-axis direction of the secondary battery 10, transferred to the other side YS2 of Y-axis direction by the Y-axis transfer device 120, transferred further down along Z-axis direction by the Z-axis transfer device 130, and transferred from the other side YS2 of Y-axis direction to one side YS1 of Y-axis direction by the Y-axis transfer device. As this process is repeatedly performed at least once, the non-contact temperature sensor unit 200 is inserted near one side 11 of Y-axis direction of the secondary battery 10 that the non-contact temperature sensor unit 200 faces within the spacing S, then taken out along Z-axis direction, and while being transferred within the spacing S, the non-contact temperature sensor unit 200 sequentially measures the temperature of many positions over the area on the Y-Z plane of the secondary battery 10 that the non-contact temperature sensor unit 200 faces. Meanwhile, in sequentially measuring the temperature of many positions over the area on the Y-Z plane of the secondary battery 10 that the non-contact temperature sensor unit 200 faces, measurement may be performed in a zigzag manner within the Y-Z plane as shown and described in FIG. 3, and measurement may be performed in any order along the vertical and horizontal directions as shown in FIG. 4.

When the temperature measurement of the outermost secondary battery is completed, the Y-axis transfer device 120 is transferred to measure the temperature of the next secondary battery 10 along X-axis direction by the X-axis transfer device 110. By the transfer of the Y-axis transfer device 120, the Z-axis transfer device 130 and the non-contact temperature sensor unit 200 are transferred together. At a transferred, new position, the temperature of many positions over the area on the Y-Z plane of the secondary battery 10 that the non-contact temperature sensor unit 200 faces is sequentially measured by the temperature measuring method as shown in FIGS. 3 and 4 described above. In this way, the non-contact temperature sensor unit 200 measures the temperature of all the secondary batteries 10 from one side of X-axis direction to the other side, and as the Z-axis transfer device 130 is transferred by the Y-axis transfer device 120 and the X-axis transfer device 110, the temperature measurement of the secondary batteries 10 is performed in a sequential order for each secondary battery 10. That is, the non-contact temperature sensor unit 200 including the single temperature sensor 202 moves down between the secondary batteries 10, measures the temperature while moving left and right, then moves back up, and this process is repeatedly performed to measure the temperature of the next secondary battery 10.

Although in this embodiment, the 3-axis transfer device 100 is described as an example as described above, any other element for allowing reciprocating translational motions in each of X-axis, Y-axis and Z-axis directions may be used in implementing the 3-axis transfer device 100. Additionally, although not described herein, in making reciprocating translational motions of each axis direction of the 3-axis transfer device 100, those skilled in the art will understand that a driving unit such as a linear motor included in the LM guide and a control unit to control the movement of the driving unit are included. Additionally, instead of the LM guide method, those skilled in the art will understand that the 3-axis transfer device 100 through a means using a controllable orbit and a servo motor and operating with them, for example, a belt, a bearing, a ball nut, a ball screw and a variety of other known devices. In other words, the driving power necessary to change the direction of the non-contact temperature sensor unit 200 may be supplied using a driving means such as a linear motor, and the driving power may be supplied using a servo motor, a stepping motor and other known motors and a belt. Additionally, when these motors operate to appropriately move the 3-axis transfer device 100 in response to a control signal of the control unit, the scheduled temperature measurement operation may be performed. Additionally, the present disclosure is not restricted or limited by the positional connection relationship, type and characteristics of each transfer device that constitutes the 3-axis transfer device 100 if it is a structure that allows 3-axis transfer. The present disclosure is characterized by transferring the non-contact temperature sensor unit, moving it in between secondary batteries to measure the temperature, then moving back up, and repeatedly performing this process to measure the temperature of many secondary batteries.

According to this embodiment, the temperature may be measured by the unit of secondary battery 10 within the tray 30 through the temperature measurement device T1, and the non-contact temperature sensor unit 200 may move down between the secondary batteries 10, measure the temperature, and perform this process in a repetitive manner to measure the temperature of the next secondary battery 10.

Because the non-contact temperature sensor unit 200 is moved through the 3-axis transfer device 100, it is possible to measure the temperature of all the secondary batteries 10 within the tray 30 using the single temperature sensor 202. Accordingly, it is possible to correct the capacity by the unit of secondary battery 10, not by the unit of tray 30, ensuring the capacity test accuracy. It is possible to measure the temperature of the secondary batteries 10 according to the position and time, and accumulate and store the measured temperature information for use as a database (DB).

Figure 5:
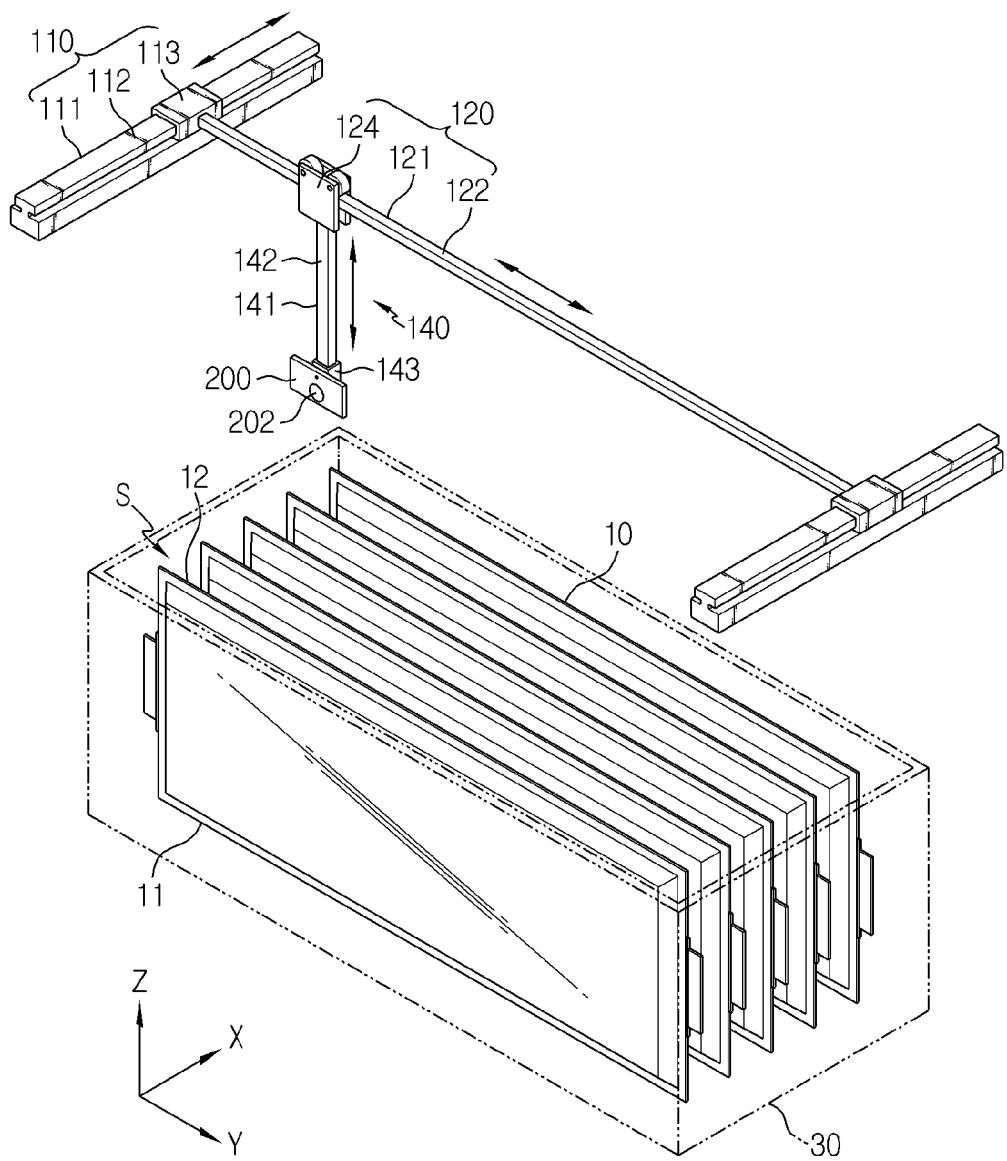
FIG. 5 shows a temperature measurement device according to a second embodiment of the present disclosure.

Subsequently, FIG. 5 shows the temperature measurement device according to the second embodiment of the present disclosure. The temperature measurement device T2 according to the second embodiment is only different from the first embodiment described with reference to FIG. 2 in a Z-axis transfer device 140, and in this embodiment, a representative example of other element making reciprocating translational motions in Z-axis direction is described. Regarding the same or similar elements to the first embodiment, a redundant description is omitted herein.

In this embodiment, the Z-axis transfer device 140 includes a Z-axis guide beam 141 which stands such that it forms a right angle with the Y-axis guide beam 121 and in which a Z-axis LM guide 142 is installed in the lengthwise direction, and a Z-axis sliding block 143 having a Z-axis LM slider to make reciprocating motions in the lengthwise direction of the Z-axis guide beam 141, and the Z-axis LM slider is fitted into the Z-axis LM guide 142 and slides in the lengthwise direction. In this embodiment, reciprocating translational motions in X-axis, Y-axis and Z-axis directions may be made by including the LM guide and the LM slider.

Meanwhile, in the previously described first and second embodiments, each of the non-contact temperature sensor unit 200 and the Z-axis transfer device 130 or 140 provided in the temperature measurement device T1 or T2 is one. As their variation, the temperature measurement device may have the number of non-contact temperature sensor units 200 and Z-axis transfer devices 130 or 140 corresponding to the number of secondary batteries 10. In this instance, there is no need to transfer the Z-axis transfer device 130 in X-axis direction to measure the temperature of all the secondary batteries 10. Accordingly, the X-axis transfer device 110 as in the first and second embodiments may not be necessary. The X-axis transfer device 110 may not be included, and instead, a structure that supports the Y-axis transfer device 120 may be included. For example, the temperature measurement device of FIG. 6 may be provided.

Figure 6:
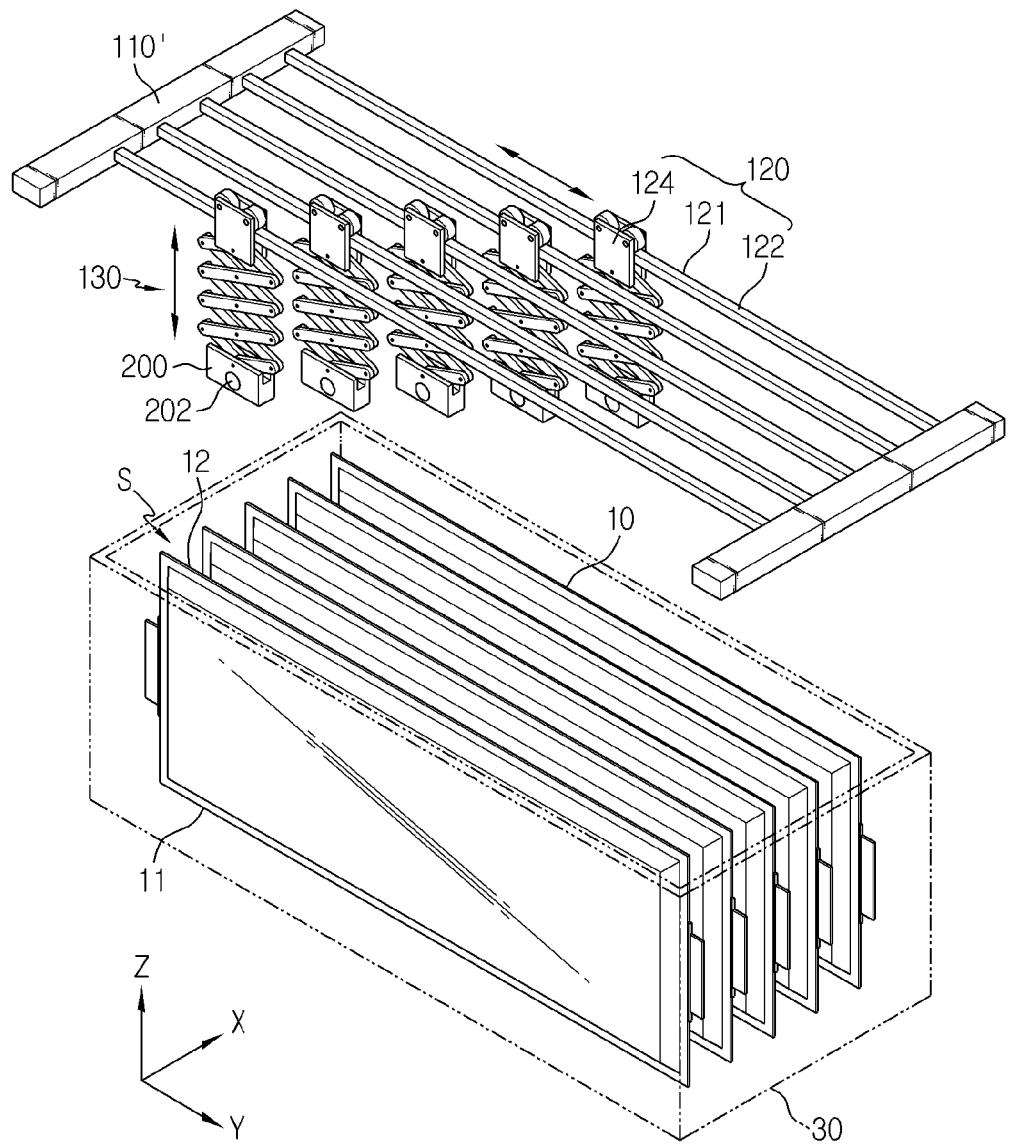
FIG. 6 shows a temperature measurement device according to a third embodiment of the present disclosure.

FIG. 6 shows the temperature measurement device according to the third embodiment of the present disclosure.

The temperature measurement device T3 according to the third embodiment includes the number of non-contact temperature sensor units 200 and Z-axis transfer devices 130 corresponding to the number of secondary batteries 10, and each non-contact temperature sensor unit 200 includes a single temperature sensor 202.

In this embodiment, after the non-contact temperature sensor units 200 including the single temperature sensors 202 move down between each of the secondary batteries 10, each non-contact temperature sensor unit 200 measures the temperature while moving horizontally and vertically by each Z-axis transfer device 130 and each Y-axis transfer device 120, then moves back up, and in this way, the temperature of all the secondary batteries 10 may be measured, and there is no need to transfer the Z-axis transfer device 130 in X-axis direction. The number of single temperature sensors 202 is used as much as the number of secondary batteries 10, thereby reducing the measurement time.

To support the Y-axis transfer device 120, the third embodiment is the same as the first embodiment except that an X-axis frame 110' is provided in place of the X-axis guide beam 111 of the X-axis transfer device 110 of the first embodiment. Although the X-axis frame 110' is shown as a bar or rod shape like the X-axis guide beam 111, it may be a wall element standing along Z-axis direction, and an element of a bar or rod shape further including a support for supporting in Z-axis direction. Meanwhile, as a variation of the third embodiment, instead of the Z-axis transfer device 130, the Z-axis transfer device 140 such as the second embodiment may be provided.

Figure 7:
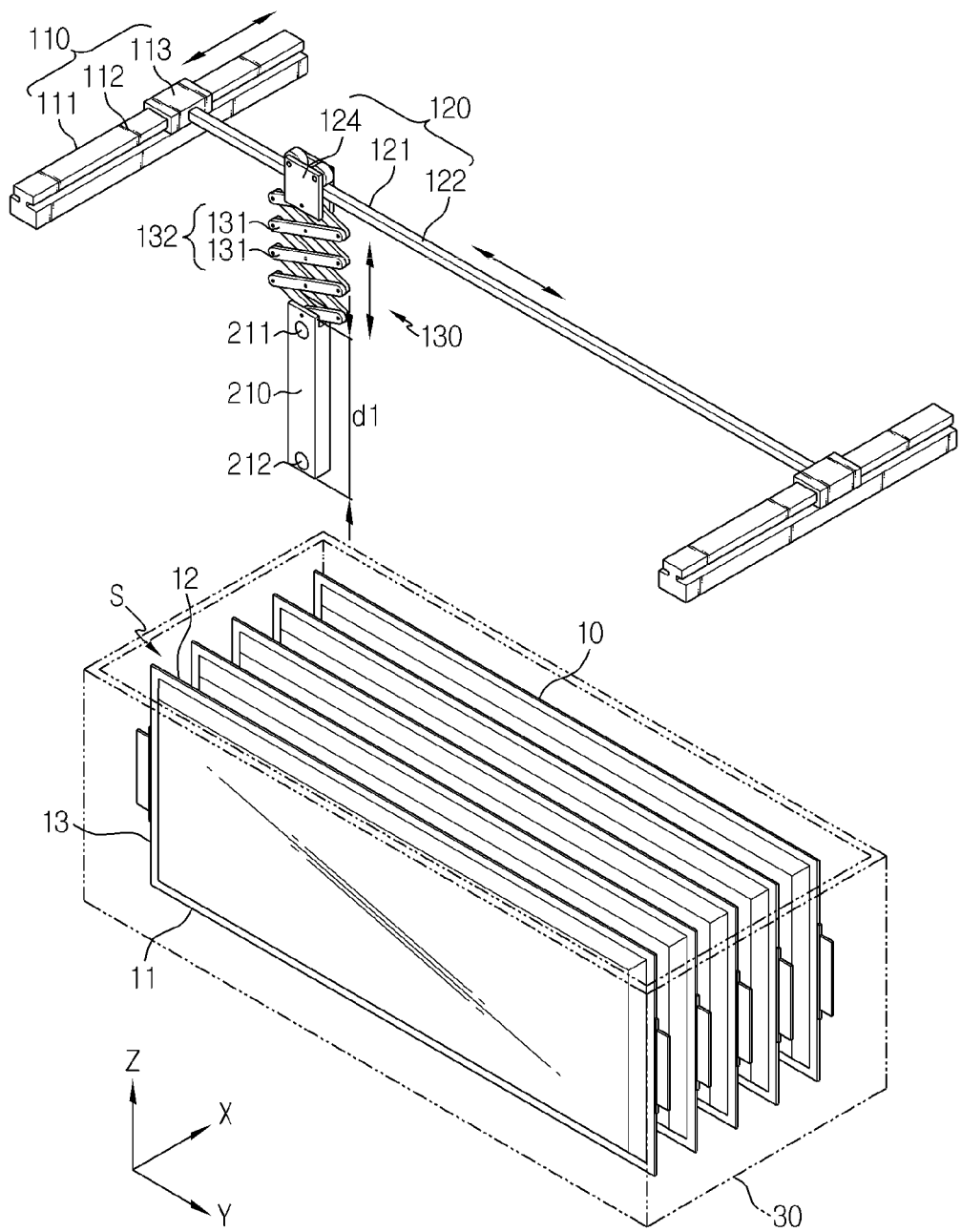
FIG. 7 shows a temperature measurement device according to a fourth embodiment of the present disclosure.

FIG. 7 shows the temperature measurement device according to the fourth embodiment, and it is the same as the first embodiment in regards to including the 3-axis transfer device, but their difference is a non-contact temperature sensor unit 210.

Referring to FIG. 7, in the temperature measurement device T4 of the fourth embodiment, the non-contact temperature sensor unit 210 includes a strip member 211 of a length d1 corresponding to one side 13 of Z-axis direction of the secondary batteries 10 and multiple temperature sensors 212 arranged along Z-axis direction on the strip member 211. The 3-axis transfer device including the X-axis transfer device 110, the Y-axis transfer device 120 and the Z-axis transfer device 130 is the same as that of the first embodiment, the temperature measurement method is similar to that of the first embodiment, and the use of the plurality of sensors may reduce the measurement time.

The non-contact temperature sensor unit 210 measures the temperature from one side of X-axis direction, and while the Z-axis transfer device 130 is transferred by the X-axis transfer device 110, the temperature measurement of the secondary batteries 10 is performed in a sequential order for each secondary battery 10.

Figure 8:
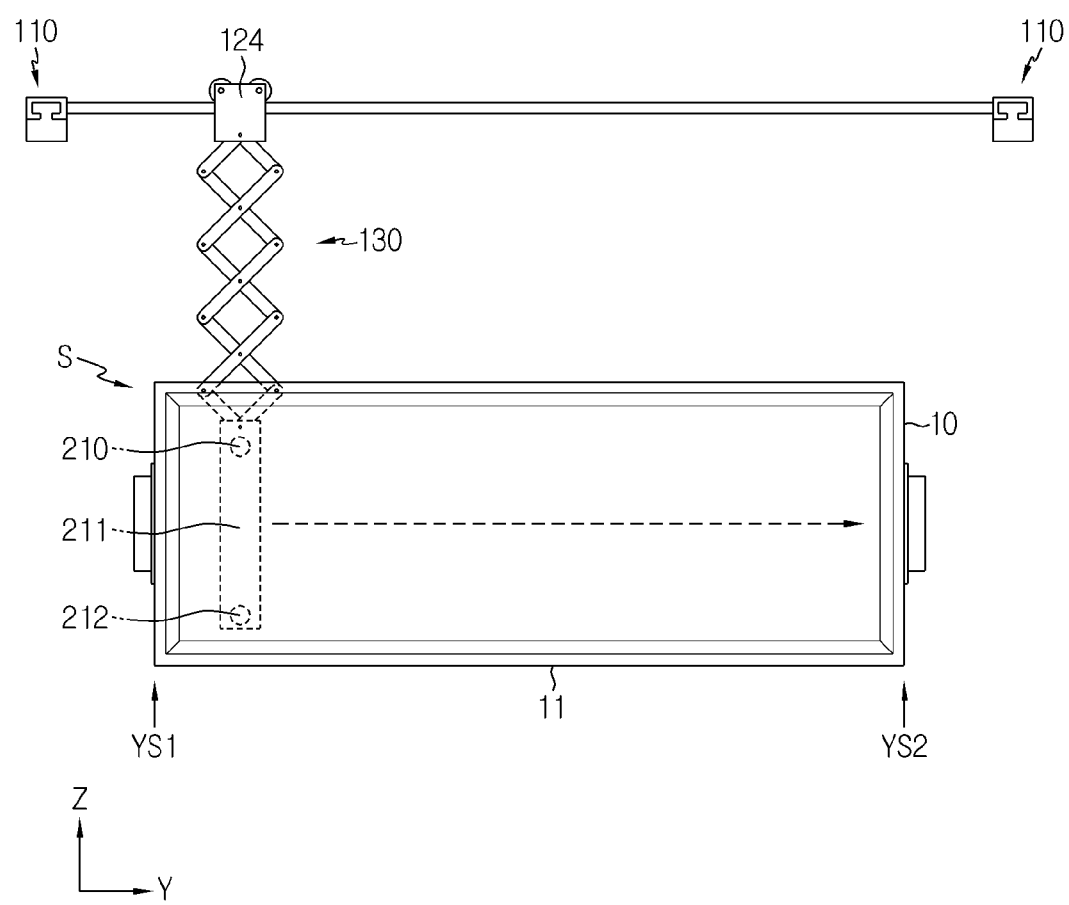
FIG. 8 is a diagram illustrating a method for measuring the temperature of one secondary battery in a fourth embodiment of the present disclosure.

Referring to FIG. 8, the non-contact temperature sensor unit 210 is moved down between the secondary batteries 10, inserted into the spacing S on one side YS1 of Y-axis direction, transferred to the other side YS2 of Y-axis direction by the Y-axis transfer device 120, then taken out, and while being transferred within the spacing S, the non-contact temperature sensor unit 210 sequentially measures the temperature of many positions over the area on the Y-Z plane of the secondary battery that the non-contact temperature sensor unit 210 faces.

Meanwhile, as a variation of the fourth embodiment, instead of the Z-axis transfer device 130, the Z-axis transfer device 140 as in the second embodiment may be provided. Additionally, as a variation of the fourth embodiment, the temperature measurement device may include the number of Z-axis transfer devices 130 and non-contact temperature sensor units 210 corresponding to the number of secondary batteries 10 in the same way as the third embodiment.

Figure 9:
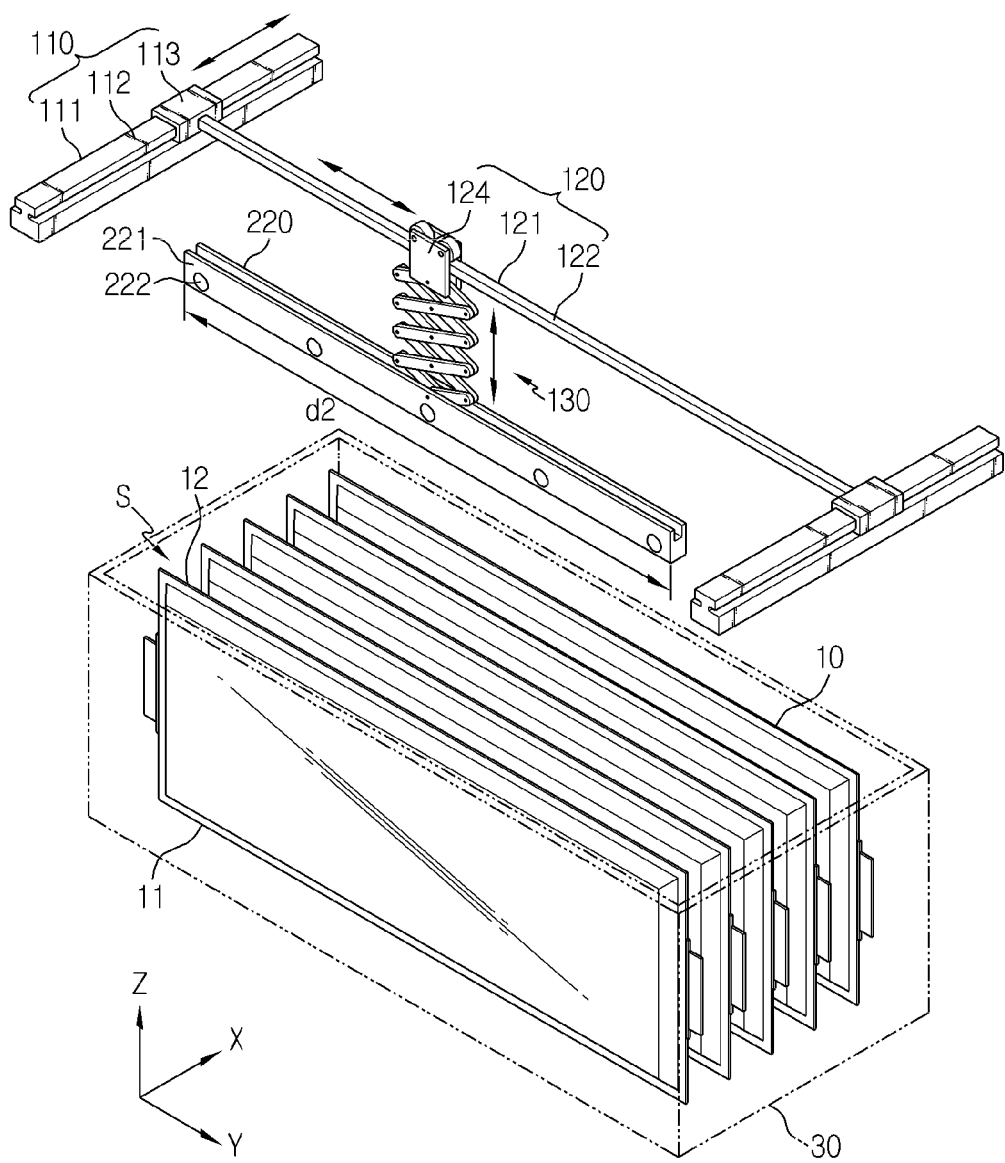
FIG. 9 shows a temperature measurement device according to a fifth embodiment of the present disclosure.

FIG. 9 shows the temperature measurement device according to the fifth embodiment, and it is similar to the fourth embodiment, but their difference is a non-contact temperature sensor unit 220.

In the temperature measurement device T5 according to the fifth embodiment shown in FIG. 9, the non-contact temperature sensor unit 220 includes a strip member 221 of a length d2 corresponding to one side 11 of Y-axis direction of the secondary batteries 10 and multiple temperature sensors 222 arranged along Y-axis direction on the strip member 221. That is, it is the same as the fourth embodiment in regards to including the multiple temperature sensors arranged in a line, but the arrangement direction is perpendicular to that of the fourth embodiment.

Figure 10:
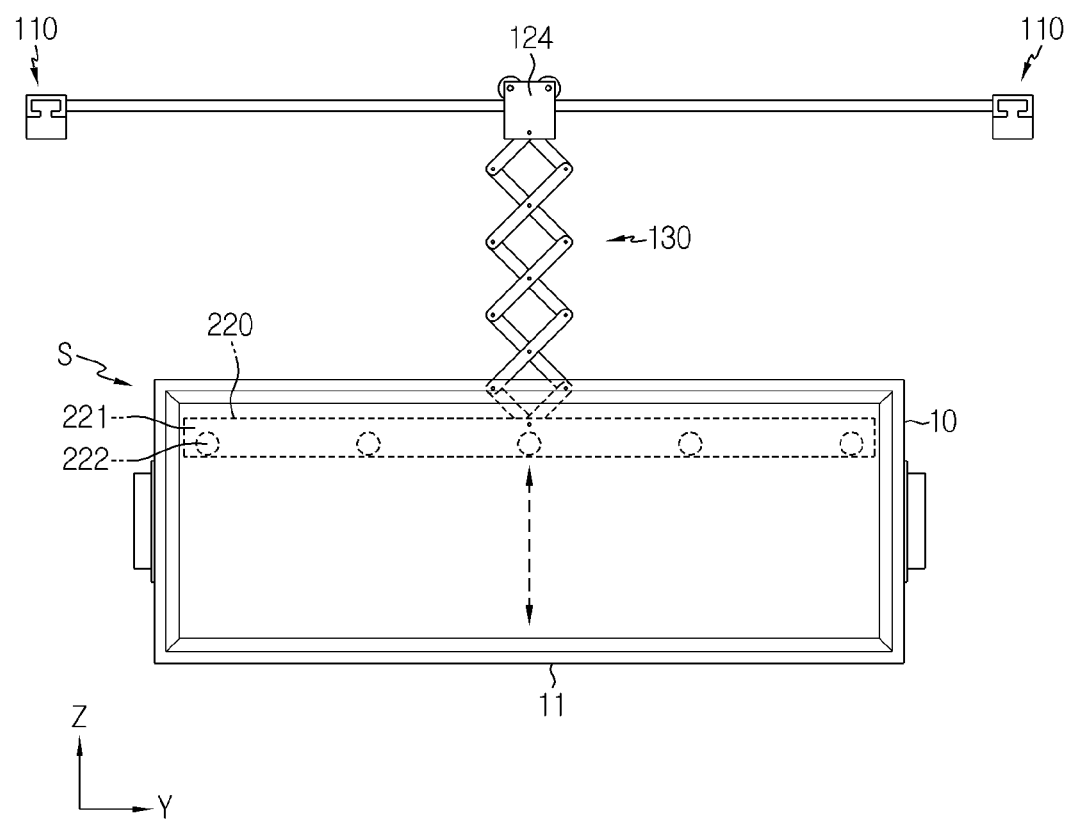
FIG. 10 is a diagram illustrating a method for measuring the temperature of one secondary battery in a fifth embodiment of the present disclosure.

As shown in FIG. 10, the Z-axis transfer device 130 moves down the non-contact temperature sensor unit 220 between the secondary batteries 10, inserts into the spacing S, so that the non-contact temperature sensor unit 220 is inserted near one side 11 of Y-axis direction of the secondary battery 10 that the non-contact temperature sensor unit 220 faces, then takes out, and while being transferred within the spacing S, the non-contact temperature sensor unit 220 measures the temperature of many positions in a sequential order over the area on the Y-Z plane of the secondary battery 10 that the non-contact temperature sensor unit 220 faces.

The non-contact temperature sensor unit 220 measures the temperature from one side of X-axis direction, and as the Z-axis transfer device 130 is transferred by the X-axis transfer device 110, the temperature measurement of the secondary batteries 10 is performed in a sequential order for each secondary battery 10.

In this embodiment, because there is no need to transfer the Z-axis transfer device 130 in Y-axis direction to measure the temperature of all the secondary batteries, instead of the Y-axis transfer device 120 described in the previous embodiments, other element on which the Z-axis transfer device 130 is mounted and which is transferred along X-axis direction by the X-axis transfer device 110 may be provided. In another example, the Z-axis transfer device 130 may be directly connected and mounted on the X-axis LM slider 113 of the X-axis transfer device 110 without the Y-axis transfer device 120 and transferred in X-axis direction along the X-axis transfer device 110. That is, provided that the multiple temperature sensors 222 arranged along Y-axis direction is included, a 2-axis transfer device including the X-axis transfer device 110 and the Z-axis transfer device 130 may be implemented.

Also, as a variation of the fifth embodiment, instead of the Z-axis transfer device 130, the Z-axis transfer device 140 as in the second embodiment may be provided. Additionally, as a variation of the fifth embodiment, the temperature measurement device may include the number of Z-axis transfer devices 130 and non-contact temperature sensor units 220 corresponding to the number of secondary batteries 10 in the same way as the third embodiment.

Figure 11:
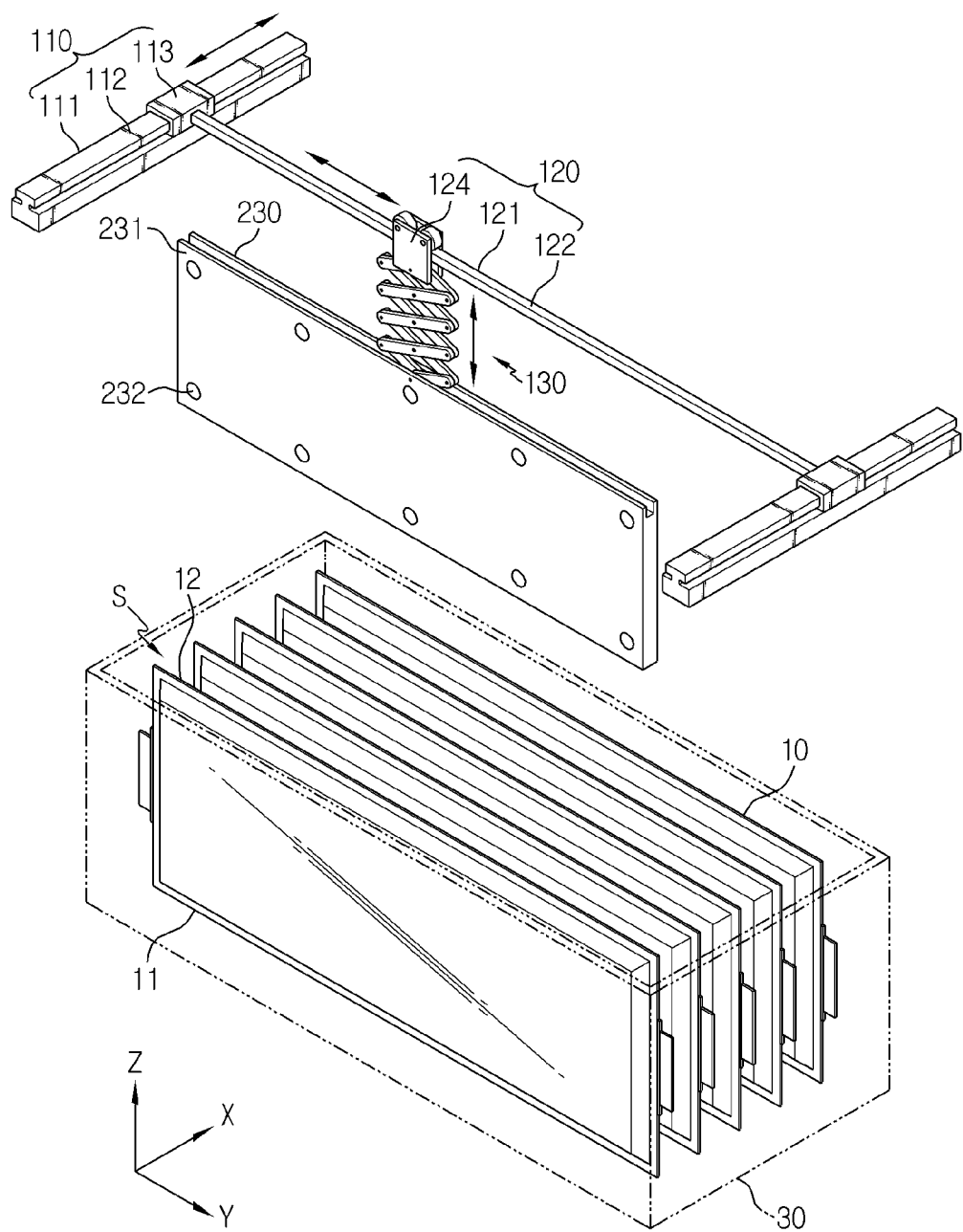
FIG. 11 shows a temperature measurement device according to a sixth embodiment of the present disclosure.

FIG. 11 shows the temperature measurement device according to the sixth embodiment of the present disclosure. The sixth embodiment is the same as the first embodiment in regards to including the 3-axis transfer device, but their difference is a non-contact temperature sensor unit 230.

Figure 12:
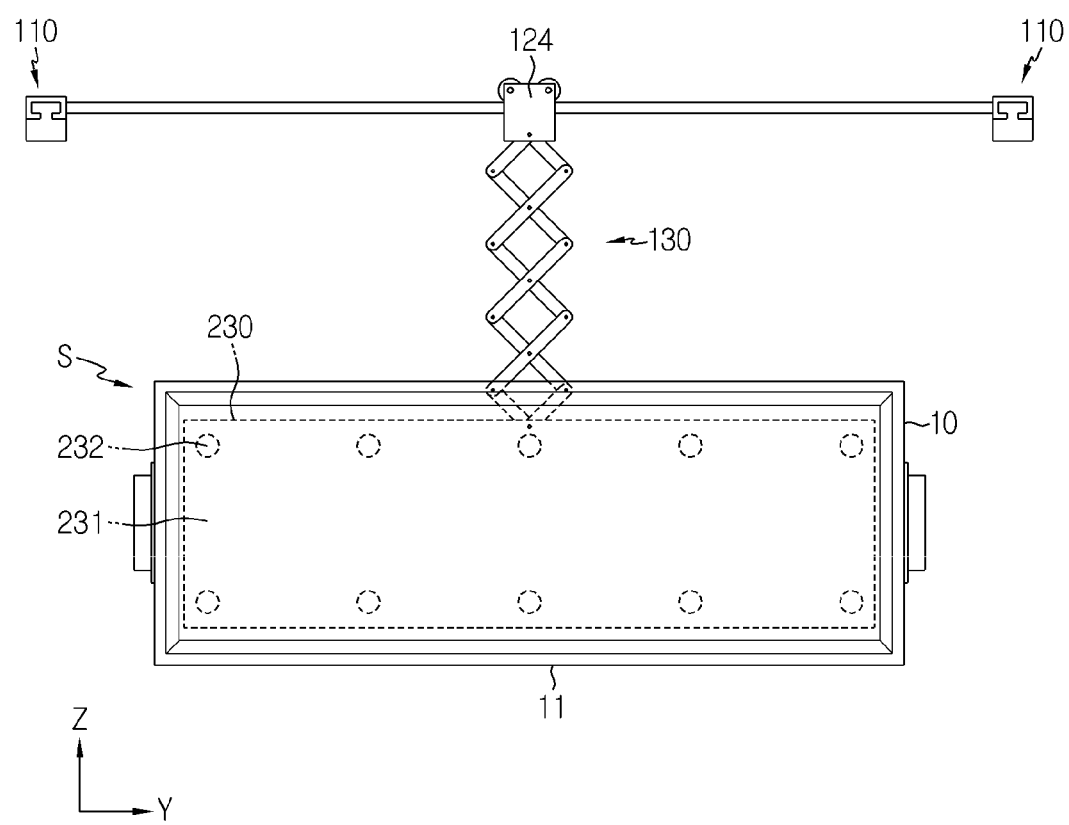
FIG. 12 is a diagram illustrating a method for measuring the temperature of one secondary battery in a sixth embodiment of the present disclosure.

Referring to FIG. 11, in the temperature measurement device T6 of the sixth embodiment, the non-contact temperature sensor unit 230 includes a plate member 231 of an area corresponding to the area on the Y-Z plane of the secondary batteries 10 and multiple temperature sensors 232 arranged along the Y-axis and Z-axis on the plate member 231, and as shown in FIG. 12, the non-contact temperature sensor unit 230 is moved down between the secondary batteries 10 and inserted into the spacing S, simultaneously measures the temperature of many positions over the area on the Y-Z plane of the secondary battery 10 that the non-contact temperature sensor unit 230 faces, then is taken out. The use of the plurality of sensors may reduce the measurement time.

The non-contact temperature sensor unit 230 measures the temperature from one side of X-axis direction, and as the Z-axis transfer device 130 is transferred by the X-axis transfer device 110, the temperature measurement is performed for each secondary battery 10 as shown in FIG. 12, and the temperature measurement is accomplished for each secondary battery 10 in a sequential order by repeatedly performing the process including insertion by Z-axis transfer, lift up for transfer to the opposing direction and movement by X-axis transfer in that order.

In this embodiment, because there is no need to transfer the Z-axis transfer device 130 in Y-axis direction to measure the temperature of all the secondary batteries, instead of the Y-axis transfer device 120 described in the previous embodiments, other element on which the Z-axis transfer device 140 is mounted and which is transferred along X-axis direction by the X-axis transfer device 110 may be provided. In another example, the Z-axis transfer device 130 may be directly connected and mounted on the X-axis LM slider 113 of the X-axis transfer device 110 without the Y-axis transfer device 120 and transferred in X-axis direction along the X-axis transfer device 110. That is, provided that multiple temperature sensors 232 arranged along Y-axis and Z-axis are included, a 2-axis transfer device including the X-axis transfer device 110 and the Z-axis transfer device 130 may be implemented in the same way as the fifth embodiment.

Also, as a variation of the sixth embodiment, instead of the Z-axis transfer device 130, the Z-axis transfer device 140 as in the second embodiment may be provided. Additionally, in the same way as the third embodiment, as a variation of the sixth embodiment, the temperature measurement device may include the number of Z-axis transfer devices 130 and non-contact temperature sensor units 230 corresponding to the number of secondary batteries 10. In this case, the non-contact temperature sensor unit 230 needs only Z-axis transfer, not X-axis transfer and Y-axis transfer. Accordingly, there is no need for the X-axis transfer device 110 or the Y-axis transfer device 120 as in the previous embodiment, and only a structure that supports the Z-axis transfer device 130 may be necessary.

Figure 13:
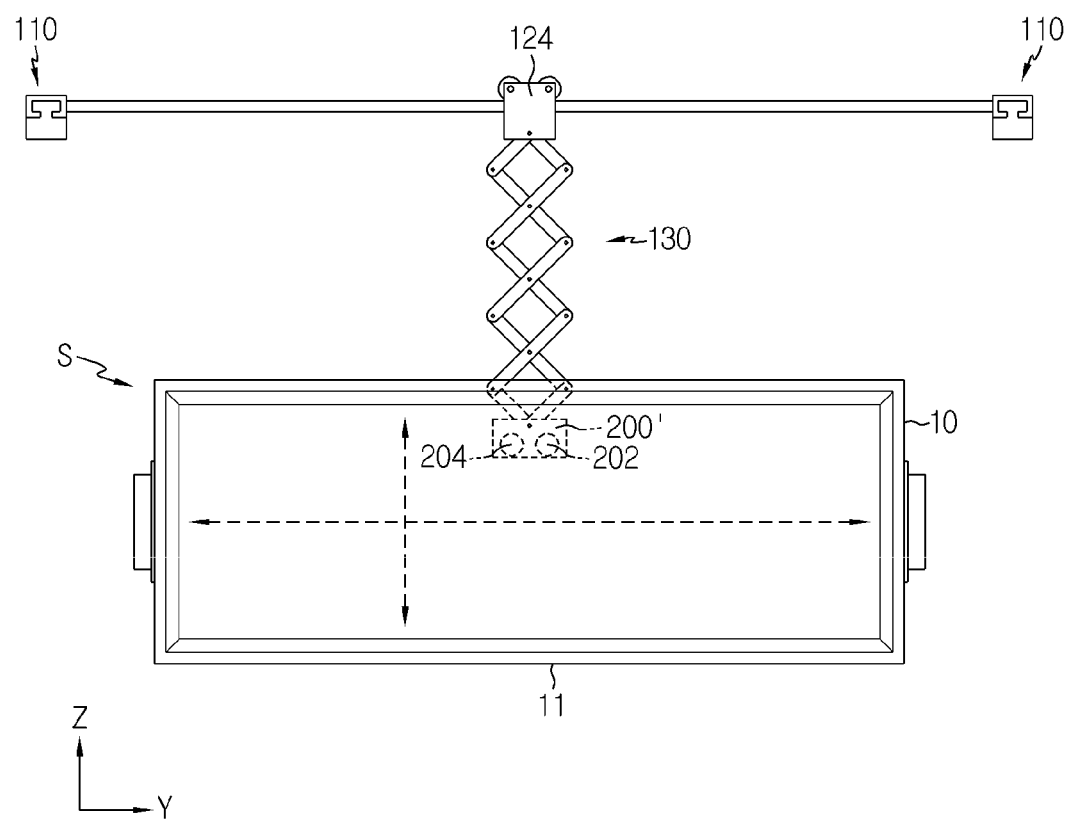
FIG. 13 shows an embodiment further including an atmosphere temperature measurement sensor in addition to a non-contact temperature sensor.

Meanwhile, the present disclosure may be configured to exclude the influence of neighboring secondary batteries to accurately measure the temperature of each secondary battery 10. It is to measure the respective temperatures of the secondary batteries 10 arranged in one space inside of the tray 30 more accurately. Referring to FIG. 13, in addition to the non-contact single temperature sensor 202, the non-contact temperature sensor unit 200' further includes an atmosphere temperature measurement sensor 204. Examples of the atmosphere temperature measurement sensor 204 include a thermistor or a thermocouple. The atmosphere temperature measurement sensor 204 measures the ambient temperature. When an ambient temperature compensation algorithm is applied using this, it is possible to improve measurement accuracy even when there is a sensor temperature change caused by ambient heat generation. As for the ambient temperature compensation algorithm, an algorithm of a known mathematical expression and a computer calculation program can be used. The multiple temperature sensors 212, 222, 232 described with reference to FIGS. 7, 9 and 11 may further include the atmosphere temperature measurement sensor 204.

Various numbers and types of sensors used in the present disclosure may change depending on the cost and space. It is preferred to select and implement the sensor type on the maximum cost saving level.

According to the present disclosure described hereinabove, basically, the moveable temperature measurement device transfers the non-contact temperature sensor unit through Z-axis lift up and down by the Z-axis transfer device. When the Y-axis transfer device and/or the X-axis transfer device is further included, it is possible to reduce the number of non-contact temperature sensors necessary to measure the temperature of each secondary battery. As it is implemented in a moveable type, it is possible to measure the temperature of a plurality of secondary batteries using a small number of non-contact temperature sensors as possible.

According to the present disclosure, in particular, the secondary batteries are received in the tray, and the non-contact temperature sensor measures the temperature for each secondary battery while being transferred by the 3-axis transfer device. It is possible to measure the temperature of many positions of the secondary battery using the single sensor or the multiple sensors, and obtain data for research when the measured temperature is recorded and stored in DB.

Figure 14:
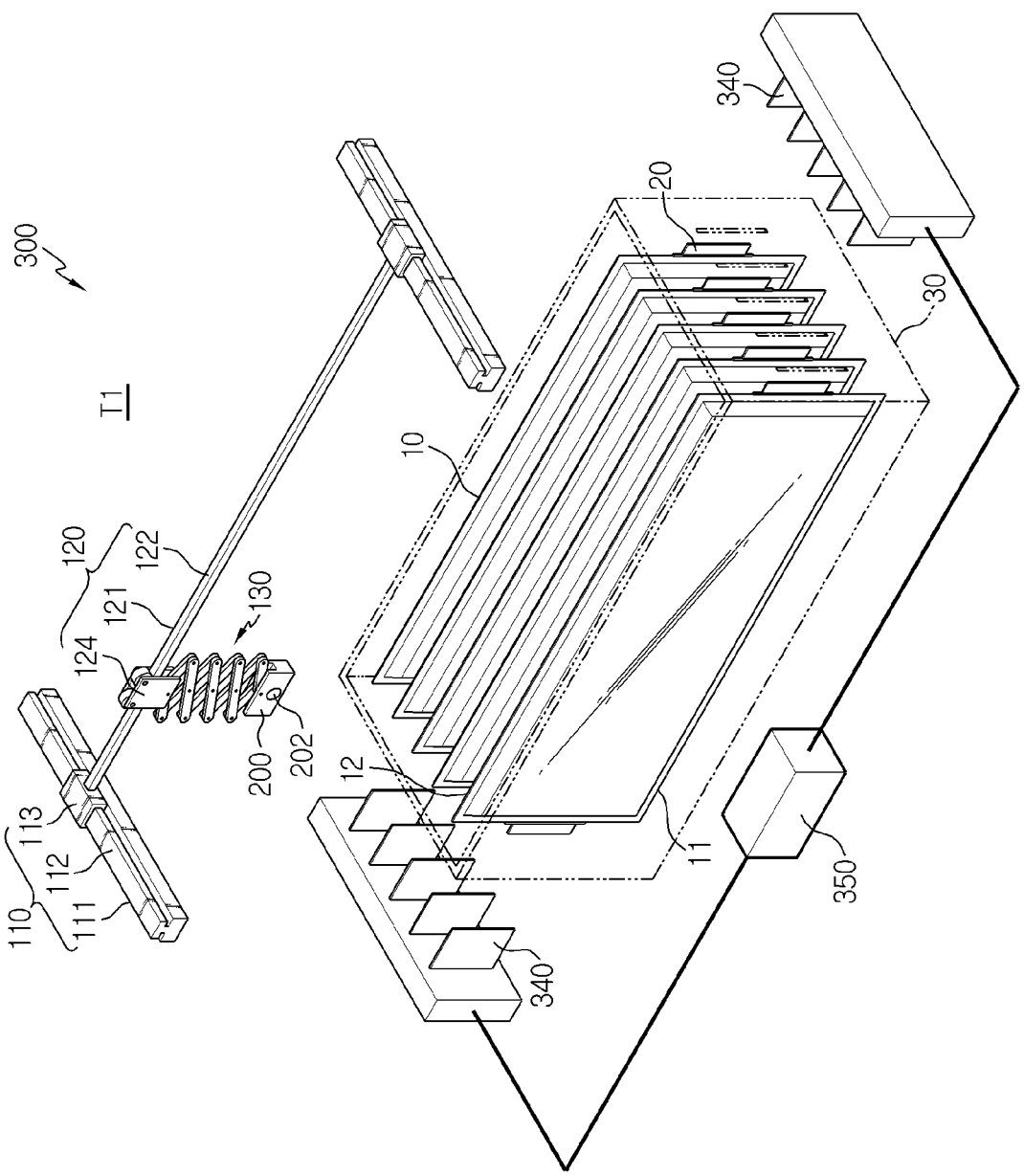
FIG. 14 shows a charge/discharge apparatus according to the present disclosure.

FIG. 14 shows the charge/discharge apparatus according to the present disclosure. The charge/discharge apparatus may include any one of all the temperature measurement devices described above, but this embodiment primarily describes the charge/discharge apparatus including the temperature measurement device T1 according to the first embodiment.

Referring to FIG. 14, the charge/discharge apparatus 300 includes a tray 30 in which a plurality of secondary batteries 10 is arranged along X-axis direction, spaced apart from one another, in a standing position with one side 11 of Y-axis direction being down. Additionally, the charge/discharge apparatus 300 includes the temperature measurement device T1 according to the first embodiment. The charge/discharge apparatus 300 also includes a charge/discharge probe 340 and a power supplier 350 to individually apply the power source to the secondary batteries 10 received in the tray 30.

The tray 30 has a space of an approximately rectangular prism shape in which the secondary batteries 10 are arranged and received, and the tray 30 has an open top so that the non-contact temperature sensor unit 200 of the temperature measurement device T1 is inserted into the spacing S between the secondary batteries 10, and is transferred, then taken out. The charge/discharge probe 340 is connected to electrode leads 20 of the secondary batteries 10 to apply the current from the power supplier 350. For convenient connection, for example, the tray 30 may have a slot (not shown) where the charge/discharge probe 340 can be inserted and detached on the side in which the electrode leads 20 of the secondary batteries 10 are disposed, but the present disclosure is not limited to the structure of the tray 30 and a particular connection structure of the charge/discharge probe 340.

The use of the charge/discharge apparatus 300 makes it possible to measure the temperature of each secondary battery 10 through the temperature measurement device T1 while charging/discharging the secondary batteries 10 within the tray 30. It is possible to calculate a temperature deviation between the secondary batteries 10, so when calculating the capacity, the temperature deviation may be taken into account. Because the temperature is measured by the unit of secondary battery 10, not by the unit of tray 30, accuracy of temperature correction in the capacity test is improved.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

What is claimed is:

1. A temperature measurement device for measuring a temperature of at least one secondary battery of a plurality of secondary batteries arranged along an X-axis direction, spaced apart from one another, in a standing position with a side of the at least one secondary battery extending in a Y-axis direction below the temperature measurement device, the temperature measurement device comprising:
  a non-contact temperature sensor unit being insertable into a spacing between adjacent secondary batteries of the plurality of secondary batteries to measure the temperature of the at least one secondary battery that the non-contact temperature sensor unit faces in a non-contact manner; and a Z-axis transfer device configured to insert the non-contact temperature sensor unit into the spacing downward from above the plurality of secondary batteries in a Z-axis direction perpendicular to the X-axis direction and the Y-axis direction and take out the non-contact temperature sensor unit in an opposing direction by lifting up and down in the Z-axis direction.

2. The temperature measurement device according to claim 1, wherein the non-contact temperature sensor unit further comprises a temperature sensor to measure atmosphere temperature.

3. A charge/discharge apparatus comprising:
the temperature measurement device according to claim 1;
a tray for receiving a plurality of secondary batteries arranged along the X-axis direction, spaced apart from one another, in a standing position with a side of at least one secondary battery extending in the Y-axis direction below the temperature measurement device; and
a charge/discharge probe; and
a power supplier to individually apply a power source to the plurality of secondary batteries.

4. The temperature measurement device according to claim 1, further comprising:
a Y-axis transfer device configured to transfer the Z-axis transfer device mounted thereon along the Y-axis direction.

5. The temperature measurement device according to claim 4, wherein the non-contact temperature sensor unit includes a single temperature sensor or multiple temperature sensors arranged along the Z-axis direction to a length corresponding to a side of the at least one secondary battery extending in the Z-axis direction.

6. The temperature measurement device according to claim 4, wherein the non-contact temperature sensor unit and the Z-axis transfer device are provided in a number corresponding to a number of the plurality of secondary batteries.

7. The temperature measurement device according to claim 4, further comprising:
an X-axis transfer device configured to transfer the Y-axis transfer device mounted thereon along the X-axis direction.

8. The temperature measurement device according to claim 7, wherein the non-contact temperature sensor unit includes a single temperature sensor or multiple temperature sensors arranged along the Z-axis direction to a length corresponding to a side of the at least one secondary battery extending in the Z-axis direction.

9. The temperature measurement device according to claim 7, wherein the Y-axis transfer device includes a Y-axis guide beam having a Y-axis linear motion (LM) guide spaced above the plurality of secondary batteries, and a Y-axis sliding block having a Y-axis LM slider configured to make a reciprocating motion along the Y-axis guide beam,
wherein the Y-axis LM slider is fitted into the Y-axis LM guide and slides along the Y-axis guide beam,
wherein the Z-axis transfer device is connected to the Y-axis sliding block,
wherein the X-axis transfer device includes a pair of X-axis guide beams parallel to each other, extending at a right angle to the Y-axis guide beam in an X-Y plane and having an X-axis LM guide om each of the X-axis guide beams, and an X-axis LM slider fitted into each of the X-axis LM guides and slides along a respective X-axis guide beam, and
wherein opposite ends of the Y-axis guide beam are connected to the X-axis LM sliders.

10. The temperature measurement device according to claim 9, wherein the Z-axis transfer device includes a Z-axis guide beam extending at a right angle to the X-axis guide beam and the Y-axis guide beam and having a Z-axis LM guide, and a Z-axis sliding block having a Z-axis LM slider configured to make a reciprocating motion along the Z-axis guide beam, and
wherein the Z-axis LM slider is fitted into the Z-axis LM guide and slides along the Z-axis guide beam.

11. The temperature measurement device according to claim 9, wherein the Z-axis transfer device is a link unit including at least one X-type link including two link members rotatably cross-linked together.

12. The temperature measurement device according to claim 4, wherein the Y-axis transfer device includes a Y-axis guide beam having a Y-axis linear motion (LM) guide spaced above the plurality of secondary batteries, and a Y-axis sliding block having a Y-axis LM slider configured to make a reciprocating motion along the Y-axis guide beam,
wherein the Y-axis LM slider is fitted into the Y-axis LM guide and slides along the Y-axis guide beam, and
wherein the Z-axis transfer device is connected to the Y-axis sliding block.

13. The temperature measurement device according to claim 12, wherein the Z-axis transfer device includes a Z-axis guide beam extending at a right angle to the Y-axis guide beam and having a Z-axis LM guide, and a Z-axis sliding block having a Z-axis LM slider configured to make a reciprocating motion along the Z-axis guide beam, and
wherein the Z-axis LM slider is fitted into the Z-axis LM guide and slides along the Z-axis guide beam.

14. The temperature measurement device according to claim 12, wherein the Z-axis transfer device is a link unit including at least one X-type link including two link members rotatably cross-linked together.

15. The temperature measurement device according to claim 1, further comprising:
an X-axis transfer device configured to transfer the Z-axis transfer device mounted thereon along the X-axis direction.

16. The temperature measurement device according to claim 15, wherein the non-contact temperature sensor unit includes multiple temperature sensors arranged along the Y-axis direction to a length corresponding to the side of the at least one second battery extending in the Y-axis direction or a plate member having an area corresponding to an area defined in a Y-Z plane of the at least one secondary battery with multiple temperature sensors arranged along the Y-axis and the Z-axis on the plate member.

17. The temperature measurement device according to claim 15, wherein the X-axis transfer device includes a pair of X-axis guide beams parallel to each above the plurality of secondary batteries and having an X-axis linear motion (LM) guide on each of the X-axis guide beams, and an X-axis sliding block having an X-axis LM slider fitted into each of the X-axis LM guides and configured to make a reciprocating motion along a respective X-axis guide beam, and
wherein the Z-axis transfer device is connected to the X-axis sliding block.

18. The temperature measurement device according to claim 17, wherein the Z-axis transfer device is a link unit including at least one X-type link including two link members rotatably cross-linked together.

19. The temperature measurement device according to claim 17, wherein the Z-axis transfer device includes a Z-axis guide beam extending at a right angle to the X-axis guide beam and having a Z-axis LM guide, and a Z-axis sliding block having a Z-axis LM slider configured to make a reciprocating motion along the Z-axis guide beam, and
wherein the Z-axis LM slider is fitted into the Z-axis LM guide and slides along the Z-axis guide beam.

* * * * *